US006156416A

United States Patent [19]

Daems et al.

[11] Patent Number: 6,156,416

[45] Date of Patent: Dec. 5, 2000

[54] TRANSFER FOIL FOR USE IN ELECTROSTATOGRAPHIC PRINTING

[75] Inventors: Eddie Daems, Herentals; Werner Op de Beeck, Putte; Luc Van Steen, Malderen-Londerzeel, all of Belgium

[73] Assignee: Agfa-Gevaert, N.V., Mortsel, Belgium

[21] Appl. No.: 09/188,299

[22] Filed: Nov. 10, 1998

Related U.S. Application Data

[60] Provisional application No. 60/074,127, Feb. 9, 1998.

[30] Foreign Application Priority Data

Dec. 4, 1997 [EP] European Pat. Off. .............. 97203814

[51] Int. Cl.[7] ........................................ B32B 7/02

[52] U.S. Cl. ........................... 428/213; 428/327; 428/484

[58] Field of Search ................................. 428/41.8, 42.2, 428/195, 304.4, 913, 914, 212, 213, 327, 484

[56] References Cited

U.S. PATENT DOCUMENTS

| | | | |
|---|---|---|---|
| 4,064,285 | 12/1977 | Mammino . | |
| 4,066,802 | 1/1978 | Clemens . | |
| 4,216,283 | 8/1980 | Cooper et al. . | |
| 5,501,902 | 3/1996 | Kronzer | 428/323 |
| 5,811,371 | 9/1998 | Egashira et al. | 503/227 |

FOREIGN PATENT DOCUMENTS

| | | |
|---|---|---|
| 0 094 845 A2 | 11/1983 | European Pat. Off. . |
| 0 453 256 A2 | 10/1991 | European Pat. Off. . |
| 0 466 503 A1 | 1/1992 | European Pat. Off. . |
| 39 31 151 A1 | 1/1991 | Germany . |
| 39 43 556 C1 | 11/1991 | Germany . |

OTHER PUBLICATIONS

Derwent Publication, Section Ch, Week 8447, AN 84–284637 XP002062456 & JP 59 174 680 A (Fuji Xerox, Oct. 3, 1984, Abstract.

*Primary Examiner*—Bruce H. Hess
*Assistant Examiner*—Michael E. Grendzynsk
*Attorney, Agent, or Firm*—Breiner & Breiner

[57] ABSTRACT

A transfer foil comprising a support with a thickness equal to or lower than 75 μm and, directly adjacent to the support, an image receiving layer with a polymeric binder and having thickness d, a cohesive force $F_{coh}$ and adhering to the support with a force $F_{rel}$ characterised in that $F_{rel}>F_{coh}$. Preferably between the support and the image receiving layer a release layer is present.

The cohesive force of the image receiving layer is controlled by adding a "promotor for cohesive break" to the layer. Such a promotor is selected from the group consisting of spacing particles with an average volume diameter $d_{v50}>0.9d$, waxes, polymers, different from the polymeric binder and cross-linking agents for the polymeric binder.

7 Claims, No Drawings

TRANSFER FOIL FOR USE IN ELECTROSTATOGRAPHIC PRINTING

This application claims benefit to provisional application Ser. No. 60/074,127 Feb. 9, 1998.

FIELD OF THE INVENTION

This invention relates to a transfer foil used for the production of images that can be transferred to other substrates. It relates especially to a transfer foil useful in electro(stato)graphic printing methods for the production of images that can be transferred.

BACKGROUND OF THE INVENTION

Decoration of objects by hot-stamping or in mould decoration proceeds by applying, under pressure and/or heat, a foil carrying a coloured layer that is transferable by heat and pressure. In many applications the foil carries a uniform coloured layer. The object is decorated by pressing the foil against the object with an image bearing stamper. This latter kind of process creates a lot of wasted colour since only a small part of the coloured layer is transferred.

Printing colour images on transfer foils by electro(stato) graphic means is well known in the art. The advantage of electro(stato)graphic methods, for making such images, over traditional printing techniques (offset, screen-printing, etc.) is the simplicity of the electro(stato)graphic system, the price and, when using dry electrostatic printing, the fact that the preparation of such transfer foils can be used with very little impact on the environment. Moreover the electro(stato) graphic methods make it possible to make transfer images in small edition and even to personalise the images. Also the fact that electro(stato)graphic imaging methods are often digital printing methods present an advantage over the printing methods that are traditionally used for making images transferable by hot stamping or in-mould decoration.

In DE-A-27 27 223 a method for transferring images onto cotton T-shirts by first producing an electrostatic latent image in a known manner on an intermediate substrate, coating the latent image with thermoplastic toner, reversing the polarity of charge to transfer the toner image to a second intermediate substrate coated on both sides with a layer (preferably of polyethylene) and a thermoplastic clear lacquer layer adjacent the toner image. The toner image fixed on the substrate is transferred to the T-shirt by application of heat and pressure.

In U.S. Pat. No. 4,066,802 xerographic means to produce transfer images, mainly for transfer on fabrics are disclosed. Although the main interest of this disclosure is the decoration of fabrics, it is disclosed that the pictures may be transferred to other substrates e.g. glass, metal, synthetic and natural materials.

In U.S. Pat. No. 4,064,285 a printing process in which an image is formed in toner powder by a xerographic method and transferred to a subbing layer on a release material carried by a substrate in sheet form. The image is then heated in contact with a fabric, wood or polymeric material and the substrate coated with release material is removed. The subbing layer is a low-melting polymer selected from vinyl or vinylidene chloride, vinyl acetate, methyl-, ethyl- or butylmethacrylate or their mixtures or copolymers. The release material is a silicon or fluorinated polymer and the substrate is preferably paper. The process of this disclosure is used to print individual pictures, letters, words, etc. on fabrics, garments, household articles, furniture etc. Materials can be decorated with personalised images in full colour at low cost by a simple process using known xerographic methods and equipment. The images of this disclosure are said to be permanent, adhere well and flexible.

In JP-A-63 296982 an electro(stato)graphic method for producing coloured transfer images for transfer onto any material, e.g., thick paper, ultra thin paper, film, acrylic plate, metal plate, etc. The system is said to be less costly than conventional transfer lettering. However the method uses two foils, a first one whereon an electro(stato)graphic transfer image is printed, the transfer image is then transferred to a second (thin) foil and this foil is used to decorate the object.

In U.S. Pat. No. 4,216,283 a xerographic process comprises first depositing an electrostatic image, xerographically, onto a master dry transfer carrier sheet which is adhesive with respect to the developed image. The electrostatic image is developed with a dry toner composition containing a thermoplastic agent, to give an image which is pressure-transferable to a receptor surface. The top surface of the developed image is then contacted with the receptor surface and pressure is applied to the non-image-bearing side of the carrier sheet to transfer the image to the receptor surface. Transfer sheets bearing the required symbols can be made as and when required, and transferred to a wide variety of substrates in the usual way by pressure on the back of the transfer sheet.

In EP-A-466 503, an image carrier sheet for use in image transfer processes is disclosed. The sheet has a flexible web base carrying in order (1) a surface layer of polymeric material, and (2) a thermoplastic coating which is receptive to toner. A toner image is formed xerographically on the thermoplastic coating. The sheet carrying the image is then assembled with a receiving substrate of textile material and subjected to heat and pressure. The thermoplastic coating separates from the polymeric surface layer so that the toner image transfers to the textile substrate, wetting the substrate and flowing into intimate contact with the fibres. The disclosure is interested especially in a transfer method for printing T-shirts. The image on the transfer sheet may be semi-permanent enabling the sheet to be handled without damaging the image.

In WO-A-90 13063 a method of pattern transfer has the pattern reproduced from an original by an electrostatic or preferably a digital laser photocopier onto a transfer sheet is then juxtaposed to an adhesive, moulding or lacquer layer covering the foil. The transfer sheet is peeled off and the dry toner particles are pressed onto the outside or inside of a display window or similar image carrier, which is not necessarily plane. The method is said to be useful for the production of simple textiles, plastics, and ceramics similar artefacts, producing fast and sharp decoration on highly curved surfaces without recourse to harmful solvents.

In DE-C-39 43 556 a method of pattern transfer is disclosed having the pattern reproduced from an original by an electrostatic or preferably a digital laser photocopier onto a transfer sheet. The pattern is then juxtaposed to an adhesive, moulding or lacquer layer covering the foil. The transfer sheet is peeled off and the dry toner particles are pressed onto the outside or inside of a display window or similar image carrier, which is not necessarily plane. The method is said to be very suitable for decoration of simple textiles, plastics, and ceramics similar artefacts. The method is said to produce fast and sharp decoration on highly curved surfaces without recourse to harmful solvents.

Using the electro(stato)graphic methods above do give the possibility to produce personalised printing using hot-stamping foils, but the toner image that is transferred can be damaged when the toner particles forming the image did, during the fixing of the image, not melt into each other so that no continuous film of toner particles is transferred.

In EP-A-453 256 a transfer foil to be imaged by an electro(stato)graphic process is disclosed. The transfer foil comprises a support, a release layer, and a transferable adhesive layer secured on the release layer. The toner particles adhere on the adhesive layer and during transfer, the image is adhered to the object to be decorated by the adhesive layer which together with the image and the release layer is transferred as a whole to the image. In this case the release layer and the adhesive layer form a kind of protective layer over the image, but this can have a detrimental effect since on the areas of the substrate to be decorated where no image is expected toner receiving layer is deposited that can impair the hue, the surface relief, etc. of the substrate that can be decorated.

Therefore further transfer foils useful in the production of transfer images by deposition of electrostatic toner particles on the foil and methods for using the same are still desirable.

OBJECTS AND SUMMARY OF THE INVENTION

It is an object of this invention to provide a transfer foil to be imaged with electrostatic toner particles, that gives good image quality and that has an image that, after being transferred, can better withstand physical strain.

It is an other object of this invention to provide a toner image on a transfer foil that can be transferred to a substrate to be decorated and that after transfer gives a physically strong image.

It is a further object of the invention to provide a toner image on a transfer foil that can be transferred to a substrate to be decorated and that, after transfer, produces an image on the substrate that carries an image-wise applied protective layer.

Further objects and advantages of the invention will become apparent from the detailed description of the invention hereinafter.

The objects of this invention are realised by providing a transfer foil comprising a support with a thickness equal to or lower than 75 μm and, directly adjacent to said support, an image receiving layer with a polymeric binder and having thickness d, a cohesive force $F_{coh}$ and adhering to said support with a force $F_{rel}$ characterised in that $F_{rel}>F_{coh}$.

The objects of the invention are further realised by providing a transfer foil comprising in consecutive order a support with a thickness equal to or lower than 75 μm, a release layer, adhering to said support with a force $F_{PET}$, and an image receiving layer with a polymeric binder and having thickness d, a cohesive force $F_{coh}$ and adhering to said release layer with a force $F_{rela}$ characterised in that $F_{PET}>F_{rela}>F_{coh}$.

DETAILED DESCRIPTION OF THE INVENTION

When printing a toner image on a transfer foil of the prior art and transferring it to a substrate to be decorated, two problems can arise. In a first case only the toner image is transferred and the toner receiving layer, whereon the toner image has been fixed, remains on the foil. When in this case, the toner particles forming the image do, during the fixing of the image, not melt into each other, the transferred image is not a continuous film of toner particles, but a only an accumulation of loosely bounded toner particles, that can easily be damaged. This problem can be avoided by using the foil with toner particles that are melting at fairly low temperature and have a high fluidity at the fixing temperature.

However, a transfer foil that can only be used with toner particles that are melting at fairly low temperature has only a restricted usefulness. In a second case both the toner image and the toner receiving layer, whereon the toner image has been fixed, are transferred to the object to be decorated. In such a transferred image, the toner image is strengthened by the toner receiving layer wherein the particles are fixed, but a transfer foil wherein both toner image and toner receiving layer are transferred, has the problem that the receiving layer is also transferred from the areas of the transfer foil, that do not bear a toner image to the substrate to be decorated. This can give a detrimental effect since on the areas of the substrate to be decorated where no image is expected toner receiving layer is deposited that can impair the hue, the surface relief, etc. of the substrate that can be decorated.

Therefore a transfer foil with a toner receiving layer whereon a toner image can be fixed and from which the image can be transferred together with the toner receiving layer but where the toner receiving layer is only transferred with the image and not from the non-imaged parts of the foil, could solve both problems referred to above. It would give a decorated substrate with a toner image that is physically strong and with non impairing of the surface of the substrate in the parts that do not bear an image.

It was found that such a toner receiving layer could be produced when the receiving layer had a cohesive force ($F_{coh}$) lower than the force with which it adhered to the support ($F_{rel}$) and when this force ($F_{rel}$) was in turn lower than the force with which the toner particles adhered, after fixing, to the toner receiving layer ($F_{ton}$). When $F_{ton}<F_{rel}$, then in use of the transfer foil, the toner particles will transfer alone, without taking the receiving layer with them.

The cohesive force ($F_{coh}$) of the toner receiving layer determines the kind of break in the receiving layer: when this force is rather low, then the layer breaks cohesively, i.e. part of the layer stay on the support and some parts (in the case of the toner receiving layer in an transfer foil of this invention, the parts carrying the toner particles) are transferred to the substrate to be decorated and the layer breaks at the boundary between the toner bearing parts and the non-toner bearing parts.

The toner receiving layer, in a transfer foil according to this invention, comprise a polymeric binder and the cohesive force of this layer can be adjusted by adding a "promoter for cohesive break" to the layer. The "promoter for cohesive break" is preferable selected from the group consisting of spacing particles with an average volume diameter $d_{v50}\geqq 0.9d$, waxes, polymers, different from said polymeric binder and cross-linking agents for said polymeric binder.

It is highly preferred to use a compound selected from the group consisting of spacing particles with an average volume diameter $d_{v50}\geqq 0.9d$ and waxes as "promoter for cohesive break".

Examples of particulate materials useful for adding to the image receiving layer to reduce cohesivity include inorganic particles (e.g. calciumcarbonate, silica, talc, titan dioxide, aluminium oxide) and organic particles, like particles of poly(tetra-fluoroethylene, polymethylsilylsesquioxane (TOSPEARL, trade name, available from Toshiba Silicone) and TEFLON MP (trade name for particles with fluoro-additives available from du Pont). The spacing particles for use as promoter for cohesive break are in this invention are preferably polymeric spacing particles having F-atom and/or Si-atoms at the surface and have preferably an average volume diameter ($d_{v50}$) that is at least 90% of the thickness, d, of the layer. More preferably, $d \leqq d_{v50} \leqq 2.5d$. When in a foil according to this invention, spacing particles are used as "promotor for cohesive break", it is preferred to use polymeric particles of poly(methylsilylsesquioxane). E.g. polymeric particles sold under trade name TOSPEARL, by Toshiba, Japan.

When in a foil according to this invention, spacing particles are used as "promotor for cohesive break", the spacing particles can be present in an amount between 1 and 50% by weight (wt/wt) with respect to the total weight of the toner receiving layer, the spacing particles are preferably present in an amount between 5 and 25% by weight (wt/wt) with respect to the total weight of the toner receiving layer.

Waxes useful as promoter for cohesive break in a layer of this invention, can be natural as well as synthetic waxes. Wax is a technological collective word for materials that have "waxy" behaviour. Compounds with "waxy" behaviour can best be described by the physical properties of the compounds. In general the greater number of waxes are characterised by the following criteria: they have a melting point of at least 40° C. (this distinguishes waxes from oils and fats), a relatively low melt-viscosity and when molten they do not form strings like threads (this distinguishes waxes from resins and plastics). "Waxy" compounds do not show chemical transformation at elevated temperatures (this last property is often cited as borderline between waxes and natural resins). Waxes and wax-like materials, useful as cohesive break promoter in an image receiving layer, of this invention, can be selected from mineral waxes, natural waxes and synthetic waxes. Examples of useful mineral waxes include petroleum waxes such as paraffin wax, microcrystalline waxes, ester wax, oxidised wax, montan wax, ozokerite and ceresine. Examples of useful natural waxes include plant waxes such as carnauba wax and Japan wax, and animal waxes such as bee wax, insect wax, shellac wax, spermaceti wax and whale wax. Very useful synthetic waxes are generally a higher aliphatic compounds such as higher aliphatic alcohols with formula $CH_3(CH_2)_nCH_2OH$, wherein n ranges from 6 to 28 or higher aliphatic acids with formula $CH_3(CH_2)_nCH_2COOH$, wherein n ranges from 6 to 28. Also unsaturated higher aliphatic alcohols or acids are useful as waxes in this invention. Further useful are, esters of the above fatty acids, e.g., ethyl stearate, lauryl stearate and ethyl behenate, amides of the above fatty acids: e.g. stearic acid amide. Also dimethylglycolphthalate can be used. The above mentioned waxes or wax like materials can be employed in the form of a solution or dispersion (emulsion). Most preferably the wax will be used as a waterborne or solvent based dispersion (emulsion).

Also polymeric waxes are very useful as promotor for cohesive break in a toner receiving layer on a foil according to this invention. Very useful polymeric waxes for use as "promoter for cohesive" break in this invention are compounds selected from the group consisting of high density polyethylene waxes, polypropylene waxes, polyvinylstearate, polyethylene sebacate, sucrose polyesters, higher aliphatic alcohols with formula $CH_3(CH_2)_nCH_2OH$, wherein n ranges from 20 to 300 or higher aliphatic acids with formula $CH_3(CH_2)_nCH_2COOH$, wherein n ranges from 20 to 300 and polyalkylene oxides. A very useful wax can be chosen from the polypropylene waxes, sold under trade name CERIDUST by Hoechst, Germany. Other waxes very useful as wax in a toner receiving layer in a transfer foil of this invention are sold under trade name UNILIN 450, UNILIN 700, (trade names of PETROLITE, 6910 East 14th street, TULSA, Okla. 74112, USA for polyolefinic alcohols with average molecular weight of 425, 700), UNITHOX 720, a trade name for a hydroxyterminated, polyolefinic polyoxyethylenic macromolecule, with average molecular weight of 875 of the same PETROLITE company and a monofunctional carboxyl terminated polyolefine as UNICID 700, a trade name of PETROLITE for a polyolefinic monocarboxylic acid with average molecular weight of 700.

Polymeric compounds useful as promoters for cohesive break can be hydrophilic colloid materials, such as polyvinylalcohol, gelatine, hydroxyalkylcellulose, polyvinylpyrrolidon, carboxy-methylcellulose, methylcellulose, polyethylene oxide and gum Arabic. Other suitable polymers as promotor for cohesive break comprise polydimethyl siloxane, methylphenylsilicone resin, tetrafluoroethylene telomer (e.g. VYDAX -trade name of du Pont, Wilmington, USA), organosilicon copolymer (e.g. SILWET L-7001 trade name of Union Carbide), polyvinyl chloride and vinyl chloride copolymers, polyvinylidene chloride and vinylidene chloride copolymers, polyethylene and polypropylene, ethylene copolymers, polystyrene, styrene copolymers. Also poly(meth)acrylates and (meth) acrylate copolymers, polyamide resins such as alcohol-soluble POLYAMIDE CM-8000 (trade name of Toray Co., Ltd.), synthetic rubber, chlorinated rubber, vinylacetate copolymers, polyvinyl acetal resins, polyhydroxystyreen (e.g. RESIN M; trade name of Maruzen Co., Ltd. Japan), can be used as promoter for cohesive break.

The image receiving layer in a transfer sheet according to this invention, comprises preferably a polymer that has good film-forming properties and that is transparent. A binder for the image receiving layer is further chosen on the basis of the adherence of toner particles to it, the ease with which such a layer is separated from the support and/or from an intermediate release layer on said support. In that case it is preferred that said release layer stays, after transfer on the support and is in its totality peeled away together with said support. It is preferred to use a binder for the image receiving layer of a transfer sheet of this invention that so that the cohesive properties of the that that layer can easily be tuned so that after image-wise transfer of the image, the receiving layer is image-wise transferred together with the toner image and thus giving good physical properties (scratch resistance, optical clarity, solvent-resistant, gloss, . . . ) to the transferred image. Examples of possible image receiving polymers, chosen with regard to the demands outlined above, include nitro-cellulose, polyvinylidene chloride and vinylidene chloride copolymers, poly(meth) acrylates and (meth)acrylate copolymers, (e.g. ELVACITE 2044, ELVACITE 2008 trade names of du Pont, Wimington USA, PLEXIGUM M345 , trade name of Röhm and Haas, Germany) modified hydroxy(meth)acrylates [e.g. JAGOTEX F 253, F 218 and F219, trade names of Ernst Jäger GMBH, Germany), polystyrene and styrene copolymers, vinylacetate copolymers, polyvinyl acetal resins (polyvinyl butyral or polyvinyl formal), polyester resins (e.g. ALMACRYL EB56 trade name of Mitsui, Ltd, Japan). vinyl choride/vinylacetate/vinyl alcohol-copolymer (e.g. UCAR VAGD trade names of Union Carbide),polyvinyl acetate, styrene/maleicanhydride copolymers (e.g. SCRIPTSET 540 trade name of Monsanto, USA), polyvinylacrylates, polyvinyl chloride and vinyl chloride copolymers, e.g., polyvinyl acetate/polyvinyl chloride copolymers such as HOSTAFLEX CM131 trade name of Hoechst Celanese Corp, USA.

In a preferred embodiment the binder resin of a toner receiving layer in a transfer foil of this invention comprises a polymer selected from the group of homo-polymers of methylmethacrylate, co-polymers including methylacrylate moieties, co-polymers including methylmethacrylate moieties, nitrocellulose being nitrated for at most 12.5 mol %, polyvinylacetate and polyvinylbutyral. Nitrocellulose being nitrated for at most 12.5 mol % is available from Wolff Walsrode AG, Walsrode, Germany under trade names Nitrocellulose TYPE A, 10.9 to 11.3% nitration, TYPE AM, 11.4 to 11.7% nitration and TYPE E, 11.8 to 12.2% nitration.

The image receiving layer in a transfer sheet according to this invention, may have a thickness of about 0,5 $\mu$m to about 10 $\mu$m. More preferable the thickness is situated between 1 and 5 $\mu$m. The toner receiving layer in a transfer foil according to this invention can be a single layer, with a thickness as given above, or a double or multiple layer if so desired, e.g., for enhancing the coating quality (smoothness, avoiding of pin-holes, etc.). When double or multiple layers are coated, the composition of the respective layers can be equal or different. In this document the layer or layers of the transfer foil whereon the toner particles are deposited and fixed and that are transferred together with the toner image when using the imaged transfer foil for decoration of objects, is the toner receiving layer.

As already said above the image receiving layer in a transfer sheet of this invention can, for enhancing the cohesive break, be partially or wholly cross-linked. This cross-linking can be obtained by chemical curing or by radiation curing.

Polymers containing a chemical reactive group such as a free hydroxyl group, like vinyl acetal resins (e.g., polyvinyl butyral or polyvinyl formal), present a point of chemical reactivity through which the resins may be made insoluble. Any chemical reagent or resinous material which reacts with secondary alcohols will react with this kind of polymers to inhibit solubility and to promote hardness. Possible cross-linking agents are e.g. phenolics, epoxides, dialdehydes, di-or-poly-isocyanates and melamines. Coating properties vary greatly with the type and amount of cross-linking agent used. Polymers like modified hydroxy (meth)acrylates (e.g. JAGOTEX F 253, F 218 and F219, trade names of Ernst Jager GMBH, Germany) or nitro-cellulose also result in good cross-linking properties when hardened with aliphatic di-or-poly-isocyanates. The curing process can be enhanced by the presence of a catalyst. A variety of catalysts can be employed to accelerate the speed of the reaction. Possible catalysts are e.g. stannous octoate, zirconium octoate, bismuthstearate and lead stearate.

Radiation (UV or EB) curable compositions containing (meth)acrylic monomers or oligomers are also effective to improve the cohesive break of the image receiving layer. UV-curable coating can broadly classified into two categories: free radical polymerised and cationic polymerised. The interest in cationically cured compositions has grown the last years. Polymers formed by free radical polymerisation are generally based upon acrylic or methacrylic monomers or oligomers, which are converted to high molecular weight polymers with varying degrees of cross-link density upon exposure to ultraviolet radiation.

In a transfer foil according to this invention, when cross-linking is used as means for controlling the cohesive break of the imaging layer, it is preferred to use chemical cross-linking.

Preferably the transfer foil comprises a plastic (synthetic polymer) support, e.g. polyester (polyethyleneterephthalate, polyethylenenaphthalate, etc.), syndiotactic polystyrene, polypropylene, etc. When a plastic support is used it is preferred to use a thermoset polymeric foil, since during the fusing of the toner image to the transfer foil, a quite high temperature can be reached. This high temperature entails the risk of wrinkling or wrapping up of the foil when the foil is not thermoset. A transfer foil comprising a thermoset support has also the advantage that it does not undergo large dimensional changes during the fusing step. The support in a transfer foil according to this invention, is preferably less than 75 $\mu$m thick, more preferably the thickness is equal to or lower than 50 $\mu$m The use of a thin support is preferred because with a thin support the transfer foil can, after being imaged, be used for decorating objects that are not flat, because a thin support follows quite easily the contours of the object to be decorated. Further, since the support of the transfer foil is stripped away and has either to be recuperated or discarded, the less material that is present, the better.

The imaging layer in a transfer sheet according to this invention can be applied to directly to a support and the releasability of said image receiving layer is secured by the fact that the surface of the support, whereon the image receiving layer is applied, is inherently releasable.

It is preferred in a transfer foil according to this invention that the support is rendered releasable by a suitable treatment or is provided with a release layer over the support surface. Such release layers preferably stay integral with the support after the image and the image-wise broken image receiving layer is transferred. In this case, a transfer foil according to this invention comprises in the order given a support with a thickness equal to or lower than 75 $\mu$m, a release layer, adhering to said support with a force $F_{PET}$, and an image receiving layer with a polymeric binder and having thickness d, a cohesive force $F_{coh}$ and adhering to said release layer with a force $F_{rela}$ characterised in that $F_{PET}>F_{rela}>F_{coh}$. In this case, also, it is preferred that force ($F_{rela}$) was in turn lower than the force with which the toner particles adhered, after fixing, to the toner receiving layer ($F_{ton}$). When $F_{ton}<F_{rela}$, then in use of the transfer foil, the toner particles will transfer alone, without taking the receiving layer with them.

The release layer may comprise hydrophilic colloid materials, such as polyvinyl alcohol, gelatine, hydroxyalkyl cellulose, polyvinylpyrrolidon, carboxymethylcellulose, methylcellulose, polyethylene oxide, gum Arabic. Other suitable release layers comprise polydimethyl siloxane, methylphenylsilicone resin, tetrafluoroethylene telomer (e.g. VYDAX trade name of du Pont), organosilicon copolymer (e.g. SILWET L-7001 -trade name of Union Carbide), polyvinyl chloride and vinyl chloride copolymers, polyvinylidene chloride and vinylidene chloride copolymers, polyethylene and polypropylene, ethylene copolymers, polystyrene, styrene copolymers, waxes and wax-like materials (see above), poly(meth)acrylates and (meth)acrylate copolymers, polyamide resins such as alcohol-soluble polyamide CM-8000 (trade name Toray Co., Ltd. Japan), synthetic rubber, chlorinated rubber, vinylacetate copolymers, polyvinyl acetal resins, polyhydroxystyreen (e.g. RESIN M; trade name of Maruzen Co., Ltd.), chlorinated polyvinylchloride (e.g., GENCLOR S, trade name of ICI LTD, UK).

The release layer may have a thickness of about 0,01 $\mu$m to about 10 $\mu$m. Most preferably the release layer comprises a binder selected from the group consisting of polyvinylpyrrolidon, polyvinylalcohol, co-poly (vinylacetate-crotonic acid), polyvinyl chloride, organosilicon release polymers, waxes or wax-like materials and polymethylmethacrylate.

Although in this document means for controlling the cohesive break of a polymeric layer is described in relation to a toner receiving layer in a transfer foil, it is clear that the means for controlling cohesive break can successfully be incorporated in any polymeric layer when cohesive break of that layer is desired. Examples of materials comprising polymeric layers wherein cohesive break is desired are, e.g., photodelamination materials based on photopolymerisation, image recording material for image recording by heat mode laser induced change in adhesion, etc.

Thus in an apparatus, for producing a master image according to this invention, several means for image-wise or non-image-wise applying of toner particles can be present and said means for depositing toner particles can be direct electrostatic printing means, wherein charged toner particles are attracted to the substrate by an electrical field and the toner flow modulated by a printhead structure comprising printing apertures and control electrodes.

Said means for depositing toner particles can also be toner depositing means wherein first a latent image is formed. In such an apparatus, said means for depositing toner particles comprise:

- means for producing a latent image on a latent image bearing member,
  - means for developing said latent image by the deposition of said toner particles, forming a developed image and
  - means for transferring said developed image on said substrate.

Said latent image may be a magnetic latent image that is developed by magnetic toner particles (in magnetography) or, preferably, an electrostatic latent image. Such an electrostatic latent image is preferably an electrophotographic latent image and the means for producing a latent image are in this invention preferably light emitting means, e.g., light emitting diodes or lasers and said latent image bearing member comprises preferably a photoconductor.

An apparatus for forming a master images on a transfer foil according to this invention, can be any apparatus for electrostatographic, magnetographic imaging, whatever the toner depositing means, both apparatus adapted for monochromatic printing and apparatus adapted for full-colour printing.

When full-colour toner images are to be printed on a transfer according to this invention, typical examples of very useful apparatus are a commercial CHROMAPRESS (a trade name of Agfa-Gevaert NV, Mortsel, Belgium), used in simplex mode and wherein five toner depositing station are present on one side of the image receiving member (i.e. in this invention the temporary support whereon the master image is formed), or an AGFA XC305 colour copier. Also apparatus as disclosed in EP-A 742 496 or equivalent co-pending U.S. Ser. No. 08/641,070 filed on Apr. 29, 1996 and in EP-A 742 497 or equivalent co-pending U.S. Ser. No. 08/636,829 filed on Apr. 23, 1996, used in simplex mode are very useful for producing a master image on a transfer sheet according to this invention. When more toner layers are wished in the master image than the number of toner depositing stations present in the apparatus it is possible to print the master image in multi-pass.

An apparatus for producing a toner image on a transfer foil according to the present invention, can comprise any fusing means known in the art. The fusing means can combine heat and pressure, radiant heat e.g. hot air, or infra-red radiation, etc. When using fusing means combining heat and pressure, heated pressure rollers can be used and silicone oil is used to impart release properties to the rollers. When using such fusing means in an apparatus for printing a toner image on a transfer foil according to this invention, it is preferred to apply said silicone oil to said rollers in such an amount that on top of the master image at most 1 g/m2 of silicone oil is present. Having more silicone oil can give problems when transferring and adhering the master image to the object to be decorated. It is preferred, in an apparatus for printing a toner image on a transfer foil according to this invention, to use fusing means using radiant heat, while in that case no silicone oil at all is present on the master image.

EXAMPLES

Support

For all examples of transfer sheets a clear polyethyleneterephthalate support was used. The thickness was between either 12 or 23 $\mu$m.

In part of the examples this support was used as such without any treatment and the image receiving layer was coated directly on that support. In further examples, the support was provided with a subbing layer as known from the art of photography and a release layer was applied to the support prior to applying the image receiving layer.

Imaging

The transfer sheets of all examples were single sided imaged in a CHROMAPRESS (trade name) of Agfa Gevaert NV, Mortsel Belgium, on the side carrying the image receiving layer. The developer used was the commercially available developer containing magnetic carrier particles coated with a silicone resin and toner particles comprising a polyester as toner resin and a cyan pigment.

Transfer

The ease and quality of transfer was tested by applying the images on the transfer foil in contact with a surface of a sheet of acrylonitrile-butadiene-styrene polymer (ABS) to be decorated.

An rectangular stamper with an even, siliconised rubber coated surface with dimension 7×13 cm was used. The contact surface between the stamper and the ABS surface was 70 $cm^2$ The image and the surface to be decorated were pressed together with a pressure of $7.10^5$ Pa for 2 seconds at 220° C.

After cooling the support was peeled away and the quality of the decoration was judged on four properties:

- transfer of the image (TT)
- transfer of the image receiving layer (TIL)
- extent to which the image receiving layer was image-wise transferred together with the toner image (ITIL)
- the ease with which the support could be stripped away, i.e. the ease of release after transfer (RAT)

The four properties were evaluated on a scale from 0 to 4, wherein 0 is very good, 1 is good, 2 is acceptable, 3 is barely acceptable, and 4 is unacceptable.

All percents in the following examples are percents by weight

Example 1 (E1)

A solution of 25 g of polymethylmethacrylate (ELVACITE 2008 trade name of du Pont, Wimington USA) in 75 g methylethylketone (MEK) as solvent was applied by gravure printing to an untreated polyethyleneterephthalate support of 23 $\mu$m thick in such a way to have a dry image receiving layer of 2 $\mu$m. The transfer sheet was imaged and the image transferred as described above. The results are tabulated in table 1.

Example 2 (E2)

Example 1 was repeated, except for the fact that the support was 12 $\mu$m thick.

Example 3 (E3)

A solution of 9% polymethylmethacrylate (ELVACITE 2008 , trade name of du Pont, Wilmington, USA) and 1% polypropylene wax (CERIDUST F3910 , trade name of Hoechst, Germany) in MEK was coated on a untreated polyethyleneterephthalate support of 12 μm thick with a 20 μm coating knife. After drying the thickness of the dry image receiving layer was 2 μm. The transfer sheet was imaged and the image transferred as described above. The results are tabulated in table 1.

Example 4 (E4)

A solution of 10% polymethylmethacrylate (PLEXIGUM M345 , trade name of Rohm & Haas Germany) in MEK was coated on a untreated polyethyleneterephthalate support of 23 μm thick with a 20 μm coating knife. After drying the thickness of the dry image receiving layer was 2 μm. The transfer sheet was imaged and the image transferred as described above.

The results are tabulated in table 1.

Example 5 (E5)

A solution of 5% polymethylmethacrylate (PLEXIGUM M345 , trade name of Röhm & Haas, Germany) and 5% hydroxypropylcellulose (KLUCEL LF, trade name of Hercules Inc., Wilmington, USA) in MEK/ethanol (1/1) was coated on a untreated polyethyleneterephthalate support of 23 μm thick with a 20 μm coating knife. After drying the thickness of the dry image receiving layer is 2 μm. The transfer sheet was imaged and the image transferred as described above The results are tabulated in tabel 1.

Example 6 (E6)

A solution of 25% of polymethylmethacrylate (ELVACITE 2008 trade name of du Pont, Wimington USA) and 2.5% of particles with silicone atoms at the surface (TOSPEARL 130 trade name of Toshiba Corp, Japan for particles made of poly(methylsilylsesquioxane) in methylethylketone (MEK) as solvent was applied by gravure printing to an untreated polyethyleneterephthalate support of 23 μm thick in such a way to have a dry image receiving layer of 2 μm.

The transfer sheet was imaged and the image transferred as described above.

The results are tabulated in tabel 1.

Example 7 (E7)

A solution of 15% polyvinylpyrrolidone in ethanol as solvent was coated on a polyethyleneterephthalate support of 12 μm thick with a subbing layer so has to form a release layer of 1 μm thick.

On top of this release layer, a solution of 25% of polymethylmethacrylate (ELVACITE 2008 trade name of du Pont, Wimington USA) and 2.5% of particles with silicone atoms at the surface (TOSPEARL 130 trade name of Toshiba Corp, Japan for particles made of poly (methylsilylsesquioxane) with an average particles diameter of 3 μm) in methylethylketone (MEK) as solvent was applied by gravure printing in such a way to have a dry image receiving layer of 2 μm.

The transfer sheet was imaged and the image transferred as described above. The results are tabulated in table 1.

Example 8 (E8)

A solution of 15% polyvinylpyrrolidone in ethanol as solvent was coated on a polyethyleneterephthalate support of 12 μm thick with a subbing layer so has to form a release layer of 1 μm thick.

On top of this release layer, a solution of 25 g of polymethylmethacrylate (ELVACITE 2008 trade name of du Pont, Wimington USA) in 75 g methylethylketone (MEK) as solvent was applied by gravure printing in such a way to have a dry image receiving layer of 2 μm. The transfer sheet was imaged and the image transferred as described above. The results are tabulated in table 1.

Example 9 (E9)

On top of a release a in example 8, a solution of 9% polymethylmethacrylate (ELVACITE 2008 , trade name of du Pont Wilmington, USA) and 1% polypropylene wax (CERIDUST F3910 , trade name of Hoechst, Germany) in MEK was coated with a 20 μm coating knife. After drying the thickness of the dry image receiving layer was 2 μm . The transfer sheet was imaged and the image transferred as described above. The results are tabulated in tabel 1.

Example 10 (E10)

A solution of 15% polyvinylpyrrolidone and 3% of amorphous silica particles with particle size $d_{v50}$=4 μm in ethanol as solvent was coated on a polyethyleneterephthalate support of 23 μm thick with a subbing layer so has to form a release layer of 1 μm thick.

On top of said release layer a solution of 25 g of polymethylmethacrylate (ELVACITE 2008 trade name of du Pont, Wimington USA) in 75 g methylethylketone (MEK) as solvent was applied by gravure printing in such a way to have a dry image receiving layer of 2 μm. The transfer sheet was imaged and the image transferred as described above. The results are tabulated in table 1.

Example 11 (E11)

A solution of 1.44 g of polyamide (CM-8000,, trade name of Toray Ltd. Japan) 0.36 g of polyhydroxystyrene (RESIN M trade name of Maruzen Co., Japan) in 80 g of methanol and 20 g of methylcellosolve, were coated on a subbed polyethyleneterephthalate support with thickness 123 μm, so as to from a release layer with thickness 1 μm.

On top of this release layer a solution of 20 g polyvinylbutyral (BUTVAR B79, trade name of Monsanto Company, USA), 6 g of

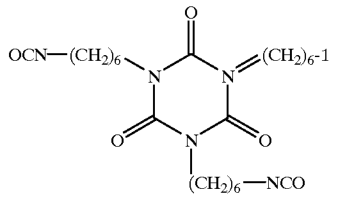

(DESMODUR N3300 trade name of Bayer AG, Leverkusen, Germany) and 3 g of dibutyl-Sn-dilaurate in 157 g of methylethylketone was coated so as to form a dry image receiving layer of 2 μm. The material was dried for 2 hours at 100° C. so that the image receiving layer was chemically cured. The transfer sheet was imaged and the image transferred as described above. The results are tabulated in table 1.

TABLE 1

| Example # | Thickness support in $\mu$m | Release layer | Image receiving layer | TT | TIL | ITIL | RAT |
|---|---|---|---|---|---|---|---|
| E1 | 23 | NO | PMMA | 0 | 0 | 1 | 1–2 |
| E2 | 12 | NO | PMMA | 0 | 0 | 3 | 1–2 |
| E3 | 12 | NO | PMMA/WAX | 2–3 | 4 | n.a. | 4 |
| E4 | 23 | NO | PMMA** | 0 | 0 | 3 | 1–2 |
| E5 | 23 | NO | PMMA/HPC | 3 | 2 | 1 | 1–2 |
| E6 | 23 | NO | PMMA/PAR | 0 | 0 | 0 | 1–2 |
| E7 | 12 | YES | PMMA/PAR | 0 | 0 | 0 | 0–1 |
| E8 | 23 | YES | PMMA | 0 | 0 | 3 | 0–1 |
| E9 | 12 | YES | PMMA/WAX | 0 | 0 | 0 | 0–1 |
| E10 | 12 | YES* | PMMA | 0 | 0 | 0 | 0–1 |
| E11 | 23 | YES | PVB/HAR | 0 | 0 | 0 | 0–1 |

PMMA: polymethylmethacrylate
**: different type of polymethylmethacrylate
WAX: polypropylene wax
HPC: hydroxypropylcellulose
PAR: TOSPEARL
HAR: hardened receiving layer
TT: transfer of the image
TIL: transfer of the image receiving layer
ITIL: extent to which the image receiving layer was image-wise transferred together with the toner image
RAT: the ease of release after transfer ()
n.a.: not applicable
*: release layer as in example 8, except for the presence of amorphous silica particles.

What is claimed is:

1. A transfer foil comprising in consecutive order a support with a thickness equal to or lower than 75 $\mu$m $\mu$m, a release layer, adhering to said support with a force $F_{PET}$, and an image receiving layer with a polymeric binder and having thickness d, a cohesive force $F_{coh}$ and adhering to said release layer with a force $F_{rela}$ wherein $$F_{PET}>F_{rela}>F_{coh},$$

said polymeric binder in said image receiving layer comprises a polymer selected from the group of homo-polymers of methylacrylate, homo-polymers of methylmethacrylate, copolymers including methylacrylate moieties, co-polymers including methylmethacrylate moieties, nitrocellulose being nitrated for at most 12.5 mol %, polyvinylacetate and polyvinylbutyral and said image receiving layer further comprises a promoter for cohesive break of said imaging layer selected from the group consisting of spacing particles with an average volume diameter $d_{v50}\leqq 0.9d$, of waxes and polymers, different from said polymeric binder and cross-linking agents for said polymeric binder, and wherein said promoter for cohesive break of said imaging layer is present in said layer in an amount between 1 and 50% by weight with respect to said polymeric binder.

2. A transfer foil according to claim 1, wherein said polymeric spacing particles are selected from the group of polymeric particles having superficial F-atoms and polymeric particles having superficial Si-atoms.

3. A transfer foil according to claim 1, wherein said release layer contains a polymer selected from the group consisting of polyvinylpyrrolidone, polyvinyl-alcohol, co-poly(vinylacetate-crotonic acid), polyvinyl chloride, organosilicon release polymers, waxes or wax-like materials and polymethylmethacrylate.

4. A transfer foil according to claim 1, wherein between said support and said release layer a subbing layer containing a polymer selected from the group of vinylidenechloride polymers, polyesters and addition polymers with itaconic acid moieties, is present and said subbing layer adheres to said support with a force $F_{PETa}$ and said release layer adheres to said subbing layer with a force $F_{hech}$.

5. A transfer foil according to claim 2, wherein said release layer contains a polymer selected from the group consisting of polyvinylpyrrolidone, polyvinylalcohol, co-poly(vinylacetate-crotonic acid), polyvinyl chloride, organosilicon release polymers, waxes or wax-like materials and polymethylmethacrylate.

6. A transfer foil according to claim 2, wherein between said support and said release layer a subbing layer containing a polymer selected from the group of vinylidenechloride polymers, polyesters and addition polymers with itaconic acid moieties, is present and said subbing layer adheres to said support with a force $F_{PETa}$ and said release layer adheres to said subbing layer with a force $F_{hech}$.

7. A transfer foil according to claim 3, wherein between said support and said release layer a subbing layer containing a polymer selected from the group of vinylidenechloride polymers, polyesters and addition polymers with itaconic acid moieties, is present and said subbing layer adheres to said support with a force $F_{PETa}$ and said release layer adheres to said subbing layer with a force $F_{hech}$.

* * * * *

UNITED STATES PATENT AND TRADEMARK OFFICE

CERTIFICATE OF CORRECTION

PATENT NO. : 6,156,416 
DATED : December 5, 2000
INVENTOR(S) : Eddie Daems et al.

It is certified that error appears in the above-identified patent and that said Letters Patent is hereby corrected as shown below:

Claim 1,
Column 13,
Line 31, "*75* $\mu$m $\mu$m" should read -- 75 $\mu$m --.

Column 14,
Line 2, "$d_{v50} \leq 0.9d$" should read -- $d_{v50} \geq 0.9d$ --.

Signed and Sealed this

Second Day of October, 2001

*Attest:*

NICHOLAS P. GODICI

*Attesting Officer* *Acting Director of the United States Patent and Trademark Office*